Patented Mar. 3, 1931

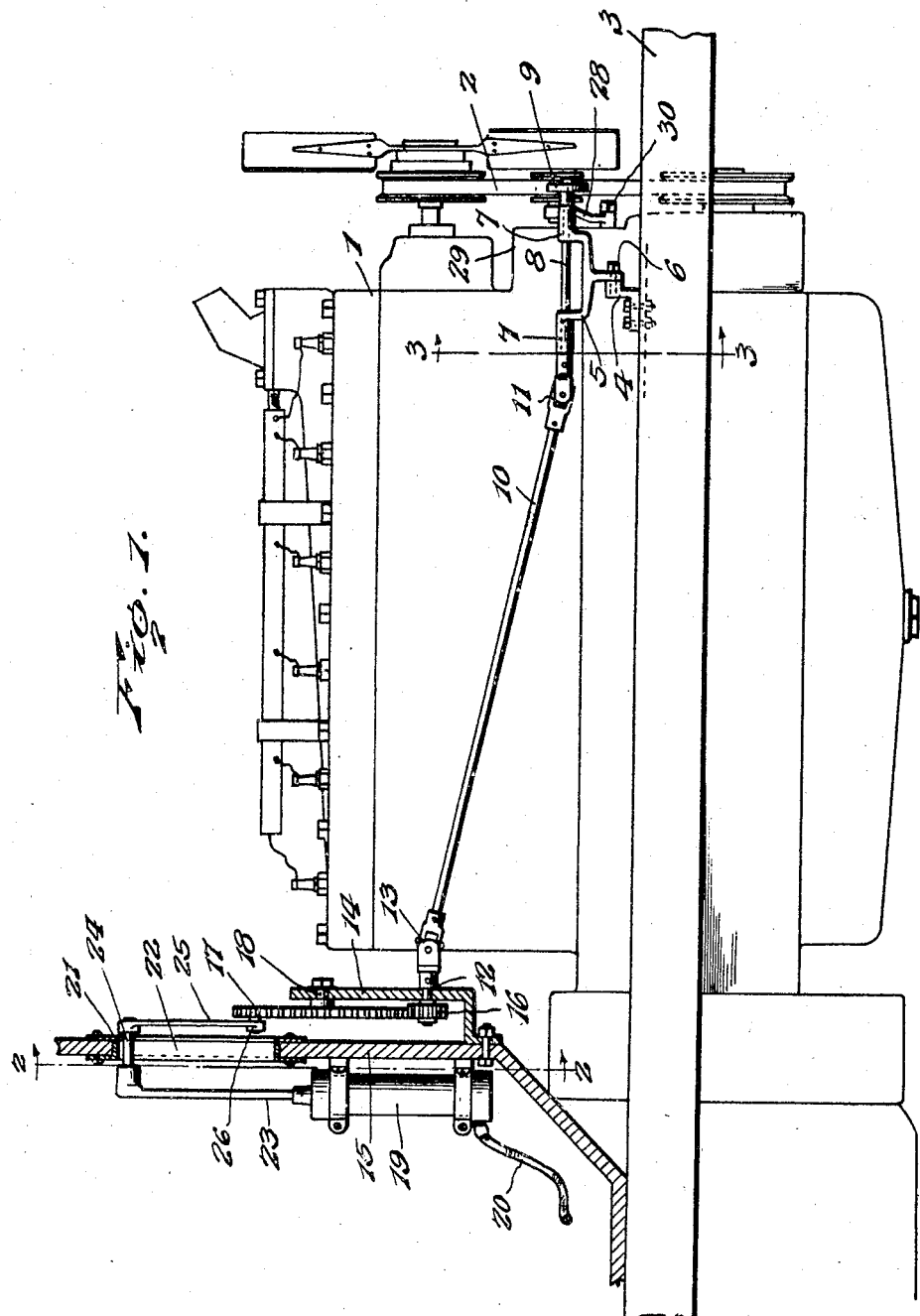

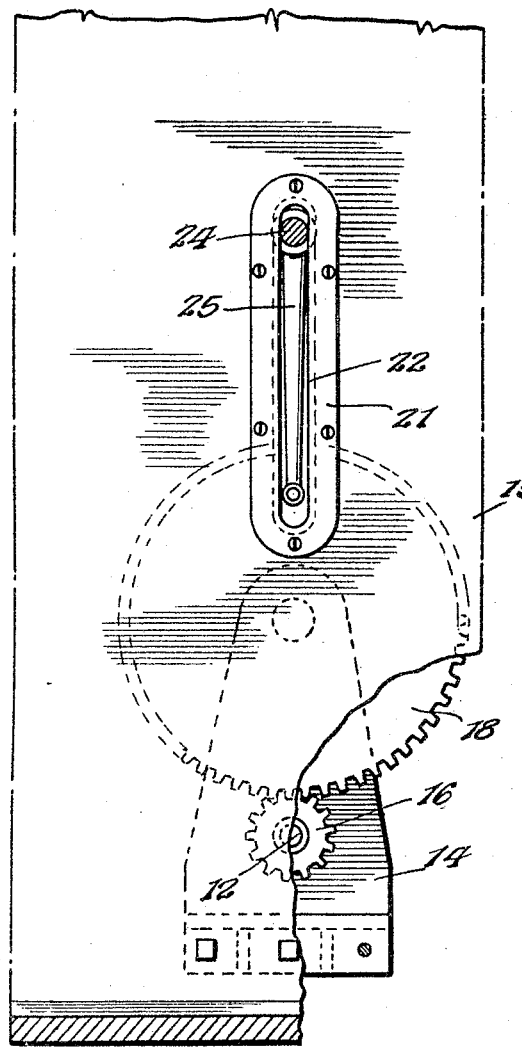
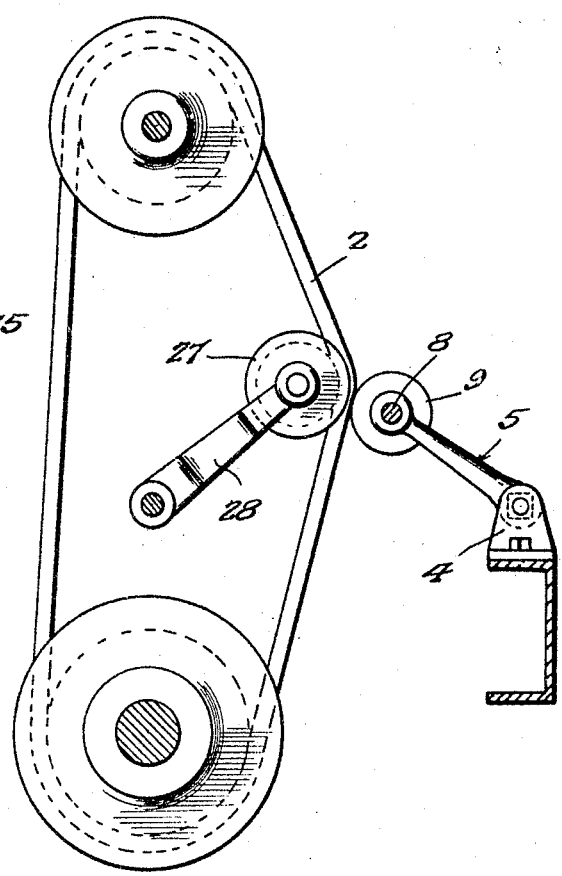

1,794,485

UNITED STATES PATENT OFFICE

EDWARD G. SCOTT, OF ODELL, ILLINOIS

TIRE PUMP

Application filed August 21, 1929. Serial No. 387,445.

The present invention is directed to improvements in tire pumps.

The primary object of the invention is to provide a pump of this character so constructed that it can be easily and quickly attached to a part of an automobile so that the power plant of the automobile may be used for driving the pump.

Another object of the invention is to provide a device of this character so constructed that when mounted upon the automobile, power for driving the pump may be derived from the fan belt or any other convenient moving part of the automobile.

Another object of the invention is to provide a device of this character which is so constructed that it can be conveniently attached to automobiles of various sizes.

Another object of the invention is to provide a device of this character which is simple in construction, efficient in operation, durable, and one which can be manufactured at a very small cost.

With these and other objects in view, this invention resides in the novel features of construction, formation, combination and arrangement of parts to be hereinafter more fully described, claimed and illustrated in the accompanying drawings, in which:

Figure 1 is a side elevation of the device showing it in place.

Figure 2 is a sectional view on the line 2—2 of Figure 1.

Figure 3 is a sectional view on the line 3—3 of Figure 1.

Referring to the drawings, 1 designates the engine of an automobile and 2 the fan belt thereof, both of which being of conventional construction. To one side frame 3 of the chassis is connected a bracket 4, said bracket having a frame 5 connected thereto and held in adjusted position by the bolt 6. The frame 5 is provided with bearings 7—7 in which is journaled a shaft 8, the forward end of the shaft having fixed thereto a friction wheel 9 while the rear end of said shaft is connected to a driving rod 10 by a universal joint 11. The rear end of the driving rod 10 is connected to a stub shaft 12 by a universal joint 13. The shaft 12 is journaled in a bracket plate 14 suitably secured to the dash board 15, said bracket plate being located in front of the dash board, as clearly shown in Figure 1 of the drawings. The shaft 12 has fixed thereto a pinion 16 which meshes with the gear wheel 17, said gear wheel being fixed on the shaft 18 journaled in the bracket plate 14. Upon the driver's side of the dash board is clamped a pump cylinder 19 and from which leads a hose 20, said hose being of sufficient length to permit the same to be positioned so that the valve thereof can be conveniently pressed upon the usual inflation tire valve.

The dash board 15 has secured thereto an escutcheon plate 21 having formed therein a vertical slot 22. The piston rod 23 of the pump has its upper end provided with a shaft 24 to which is pivotally connected the upper end of the pitman 25, the lower end of the pitman being eccentrically connected, as at 26, to the gear wheel 17.

It will be obvious that when the frame 5 is swung inwardly that the friction wheel 9 thereof will engage the fan belt 2 so as to impart rotary movement to the shaft 8 to rotate the driving rod 10 which, in turn, will impart movement to the gear wheel 17 through the medium of the pinion 16. Rotation of the gear wheel 16 will reciprocate the pitman 25, thus reciprocating the pump piston rod 23 so that air will be forced into the hose or tube 20 for conveniently inflating the tires when necessary. Since the drive rod 10 is connected with the shafts 8 and 12 through the medium of the universal joints 11 and 13, the frame 5 can be conveniently swung inwardly or outwardly and since the frame can be held in adjusted position by manipulating the bolt 6, the friction wheel 9 may be held in engagement with the belt 2 or out of engagement therewith.

To insure a firm driving connection between the fan belt 2 and the friction wheel 9, an idler pulley 27 is provided and is mounted on a frame 28, said frame being adjustably connected to the cam shaft gear housing 29. The frame 28 may be adjusted upon manipulating the clamping bolt 30 in a manner similar to the adjustment of the bolt 6.

From the foregoing, it is thought that the operation, and many advantages of the herein described invention will be apparent to those skilled in the art without further description and it will be understood that various changes in size, shape, proportion and minor details of construction may be resorted to without departing from the spirit or sacrificing any of the advantages of the invention.

What is claimed is:

1. A device of the class described comprising a tire inflating pump for attachment to the dash board of a motor vehicle, a friction wheel adapted to engage the fan belt of the vehicle motor, means for pivotally attaching the friction wheel to the vehicle chassis to engage and disengage the fan belt, a gear train for attachment to the vehicle dash board for driving the pump, and a driving rod operatively connected to said gear train and to said friction wheel.

2. A device of the class described comprising a tire inflating pump for attachment to the dash board of a motor vehicle, a bracket plate carried by the dash board, a gear wheel rotatably supported by the bracket plate, a pinion rotatably supported by the plate and in mesh with the gear wheel, a frame adjustably supported by the vehicle frame, a shaft journaled in the frame and having a friction wheel fixed upon one end, said wheel being adapted to engage the fan belt of the vehicle motor, and a driving rod connecting the shaft and pump for actuating the pump when the friction wheel is engaged with the fan belt of the motor vehicle.

3. A device of the class described comprising a tire inflating pump for attachment to the dash board of a motor vehicle, a frame mounted for swinging adjustment upon the frame of the motor vehicle, a shaft journaled in the frame and having a friction wheel thereon for engagement with the fan belt of the vehicle motor, a gear wheel and pinion supported adjacent the pump, and a driving rod having one end connected with said shaft and the other end with the pinion for driving the gear wheel to actuate the pump when the friction wheel is engaged with the fan belt.

4. A device of the class described comprising a tire inflating pump for attachment to the dash board of a motor vehicle, an escutcheon plate carried by the dash board and having a slot therein, a shaft slidable in the slot and connected with the pump piston rod, a gear wheel supported by the vehicle, a pinion supported by the vehicle and in mesh with the gear wheel, a pitman connecting the shaft and gear wheel, a frame adjustably mounted on the vehicle frame, a shaft journaled in the frame and having a friction wheel carried thereby for engagement with the fan belt of the vehicle motor, and a driving rod having universal connection at its ends with the friction wheel bearing shaft and pinion.

In testimony whereof I affix my signature.

EDWARD G. SCOTT. [L. S.]